(12) United States Patent
Stamm et al.

(10) Patent No.: US 8,067,086 B2
(45) Date of Patent: Nov. 29, 2011

(54) MATRIX AND LAYER SYSTEM COMPRISING NON-STOICHIOMETRIC PARTICLES

(75) Inventors: Werner Stamm, Mülheim an der Ruhr (DE); Jan Steinbach, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 12/225,623

(22) PCT Filed: Mar. 1, 2007

(86) PCT No.: PCT/EP2007/051929
§ 371 (c)(1),
(2), (4) Date: Sep. 26, 2008

(87) PCT Pub. No.: WO2007/110295
PCT Pub. Date: Oct. 4, 2007

(65) Prior Publication Data
US 2009/0117390 A1    May 7, 2009

(30) Foreign Application Priority Data
Mar. 27, 2006 (EP) .................................. 06006326

(51) Int. Cl.
*B32B 5/66* (2006.01)
(52) U.S. Cl. ......... 428/323; 428/328; 428/331; 428/403
(58) Field of Classification Search .................. 428/323, 428/328, 331, 403
See application file for complete search history.

(56) References Cited

U.S. PATENT DOCUMENTS

| | | | | |
|---|---|---|---|---|
| 4,275,124 A | * | 6/1981 | McComas et al. | ............ 428/564 |
| 5,070,587 A | * | 12/1991 | Nakahira et al. | .............. 432/246 |
| 5,407,705 A | | 4/1995 | Vakil | |
| 5,705,122 A | | 1/1998 | Curran | |
| 6,024,792 A | | 2/2000 | Kurz et al. | |
| 6,635,362 B2 | | 10/2003 | Zheng | |
| 6,797,335 B1 | * | 9/2004 | Paderov et al. | ................ 427/530 |
| 6,887,044 B2 | * | 5/2005 | Fleck et al. | ................ 416/241 B |
| 2002/0155316 A1 | * | 10/2002 | Zheng | ........................... 428/678 |

FOREIGN PATENT DOCUMENTS

| | | |
|---|---|---|
| EP | 0 142 418 B1 | 3/1990 |
| EP | 0 486 489 B1 | 11/1994 |
| EP | 0 733 723 A1 | 9/1996 |
| EP | 0733723 A1 * | 9/1996 |
| EP | 0733723 A1 * | 9/1996 |
| EP | 0 412 397 B1 | 3/1998 |
| EP | 0 892 090 A1 | 1/1999 |
| EP | 0 786 017 B1 | 3/1999 |
| EP | 0 995 816 A1 | 4/2000 |
| EP | 1 306 454 A1 | 5/2003 |
| EP | 1 319 729 A1 | 6/2003 |
| EP | 0 933 448 B1 | 4/2004 |
| EP | 1 204 776 B1 | 6/2004 |
| RU | 2161661 C1 | 1/2001 |
| WO | WO 99/67435 A1 | 12/1999 |
| WO | WO 00/44949 A1 | 8/2000 |
| WO | WO 02/66706 A2 | 8/2002 |

OTHER PUBLICATIONS

Abraimov N. V. et al., "Thermo-chemical treatment of Heat-Resistant Steels and Alloys", Moscow, Internet Engineering, 2001, pp. 300-301.

* cited by examiner

*Primary Examiner* — Lesze Kiliman

(57) ABSTRACT

Protective layers, according to the prior art, achieve their protective function b depletion of a defined element that forms a protective oxide layer or that is exhausted as a sacrificial material. Once said material is exhausted, the protective function cannot be maintained. The invention is characterized by using particles (1) that contain a sustained-release depot of the exhaustible material. For this purpose, the material is present in a superstoichiometric form.

19 Claims, 3 Drawing Sheets

US 8,067,086 B2

MATRIX AND LAYER SYSTEM COMPRISING NON-STOICHIOMETRIC PARTICLES

CROSS REFERENCE TO RELATED APPLICATIONS

This application is the US National Stage of International Application No. PCT/EP2007/051929, filed Mar. 1, 2007 and claims the benefit thereof. The International Application claims the benefits of European application No. 06006326.0 filed Mar. 27, 2006, both of the applications are incorporated by reference herein in their entirety.

FIELD OF INVENTION

The invention relates to a matrix and to a layer system according to the claims.

BACKGROUND OF THE INVENTION

Components for high temperature applications, for example turbine blades and combustion chamber walls of gas turbines, have protective layers against oxidation and corrosion. Such layers consist, for example, of an alloy of the MCrAlX type, a protective aluminum oxide layer being formed on this MCrAlX layer. In this case, the aluminum of the MCrAlX alloy diffuses onto the surface of the MCrAlX layer, so that the MCrAlX alloy undergoes a depletion of the element aluminum.

However, a preventatively enhanced fraction of aluminum in the MCrAlX alloy from the outset, in order to counteract depletion, leads to poorer mechanical properties of the MCrAlX layer.

Moreover, compressor blades are known which are provided with protective layers against corrosion and erosion. In production, these have an inorganic binder with a metal, the metal serving as a galvanic sacrificial element therefore being connected electrically conductively to the substrate of the component. A suitable composition of such a protective layer is known from EP 0 142 418 B1.

Even here, there is the problem that the metal is in time consumed, so that the protective function is no longer performed.

Encased powder particles which consist of Al are known from U.S. Pat. No. 6,635,362.

EP 0 933 448 B1 discloses oxide particles in a layer consisting of an aluminide.

WO 2002/066706 A2 shows a matrix with encased particles which consist of stoichiometric alloys.

SUMMARY OF INVENTION

The object of the invention, therefore, is to indicate a matrix and a layer system which have a longer protective action.

The object is achieved by means of a matrix according to the claims and a layer system according to the claims.

The respective subclaims list further advantageous measures which may advantageously be combined with one another, as desired.

DETAILED DESCRIPTION OF INVENTION

Figure 1:
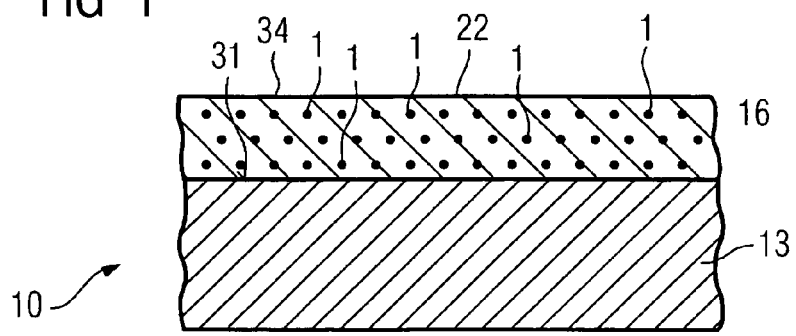
FIGS. 1, 2 and 3 show layers or a substrate according to the invention.

A compound consists of at least two or of a plurality of chemical elements and has a specific stoichiometry. An alloy (metallic compound) consists of at least two metallic elements.

The particle 1 (FIGS. 1, 2 and 3) consists of a compound which has at least one metal Me of a matrix of a layer 16 (FIGS. 1 and 2) or of a substrate 13 (FIG. 3) in a non-stoichiometric ratio. The at least one further chemical element Z, which with the metal Me forms the compound, may be a constituent of the matrix material or be a chemical element which is not contained in the matrix material.

The compound, that is to say the material of the particle 1, is, in particular, a compound of the metal Me with a non-metal, that is to say is a ceramic (non-oxide or oxide ceramic, an oxynitride, nitride, boride or carbide) and is preferably an oxide, preferably aluminum oxide and/or chromium oxide. The particle 1 also preferably has a nitride. The particle 1 preferably consists of a metal oxide and/or metal nitride.

The particle 1 may also have a plurality of types of compounds: oxides, oxynitrides, nitrides, borides or carbides.

Preferably, an above-stoichiometric compound $Me_aZ_{b-y}$ (y>0), $Me_{a+x}Z_b$ (x>0) or $Me_{a+x}Z_{b-y}$ (x>0, y>0) is used instead of $Me_aZ_b$, that is to say, for example (Z=nitrogen N) $AlN_{1-y}$ (y>0), $Al_{1+x}N$ (x>0) or $Al_{1+x}N_{1-y}$ (x>0, Y>0) instead of AlN.

The compound for the particle 1 may likewise consist of an alloy which is a non-stoichiometric composition of the alloy. Thus, for example, an alloy $Ni_{1-y}Al$ (y>0) or $NiAl_{1+x}$ (x>0) is used instead of NiAl.

Even below-stoichiometric compounds may be advantageous.

Preferably, the particle 1 has only one metal element Me.
Preferably, the particle 1 has two metal elements Me. The metal element Me in the compound, in the alloy or in the silicon chains is, in particular, aluminum (Al).

The metal element may likewise be chromium (Cr).
Furthermore, a chromium/aluminum alloy (Al—Cr) may be used, in order to produce a compound for the particle 1.

Likewise, an organic material R-Me-C—R, such as, for example, an Si-Me-O—C material (silicon chains) may be used for the particle 1 (Me=Al), C=carbon, R=carbon chain.

The R-Me-C—R material is produced, in particular, from a polysiloxane resin. Polysiloxane resins are polymer-ceramic precursors of the structural formula R—$SiO_{1.5}$ with at least one metal element, in which case R may be=—$CH_3$, —CH, —$CH_2$, —$C_6H_5$, etc. The material is cross-linked thermally, inorganic constituents (Si—O—Si chains) and organic side chains predominantly consisting of R being present next to one another. Subsequently, the precursors are ceramized via temperature treatment in Ar, $N_2$, or an air or vacuum atmosphere at temperatures of between 600° C. and 1200° C. In this case, the polymer network is decomposed and is restructured via thermal intermediate stages from amorphous to crystalline phases, a Si—Al(=Me)-O—C network being obtained, starting from polysiloxane precursors. Likewise, precursors of the type polysilane (Si—Si), polycarbosilane (Si—C), polysilazane (Si—N) or polybarosilazane (Si—B—C—N) with metal elements Me may also be used.

Here, the metal element Me does not have to be present in a non-stoichiometric ratio. It is sufficient for the compound to have the capability whereby the metal element Me can easily be released from the compound.

The particle 1 may be a sintered powder particle or a powder grain.

The diameter of the particle 1 may be in the micro, submicro (<1 μm) or nanorange (≦500 nm). The diameter may also be understood as being the greatest transverse length of a polyhedron.

The particles 1 preferably have no casing consisting of a different material.

FIG. 1 shows a matrix according to the invention of a layer 16. The layer 16 is part of a component 10 or layer system 10 consisting of a substrate 13 on which the layer 16 is arranged.

Figure 4:
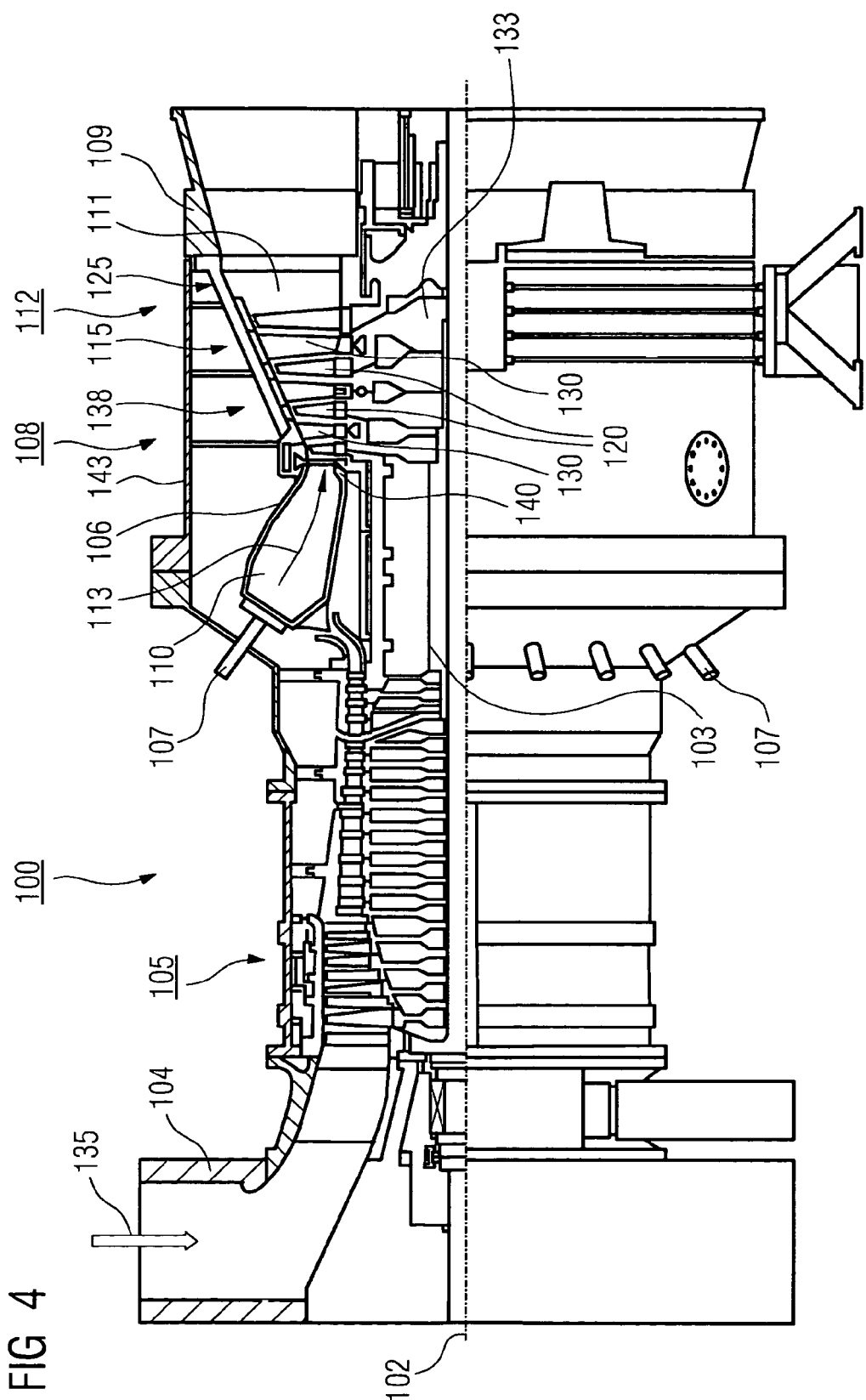
FIG. 4 shows a gas turbine.

The substrate 13 is, for example, a component for high temperatures, such as, for example, in steam or gas turbines 100 (FIG. 5), consisting of a nickel-, cobalt- or iron-based superalloy. Such layer systems 10 are employed in turbine blades 120, 130 (FIGS. 4 and 5), heat shield elements 155 (FIG. 6) or housing parts 138 (FIG. 4).

The layer 16 has a matrix consisting of a matrix material in which the particles 1 are distributed homogeneously or locally in a different way (for example, with a gradient). The particle 1 thus constitutes a secondary phase in the matrix (layer, substrate).

In this case, a local concentration gradient of the particles 1 within the layer 16 or the substrate 13 may be present. Thus, for example, starting from the surface 31 of the substrate 13, the concentration of the particles 1 increases in the direction of a surface 34 of the layer 16.

In this case, a plurality of layers 16, 19 may also be produced and used, the particles 1 being present in one or more layers.

Figure 2:
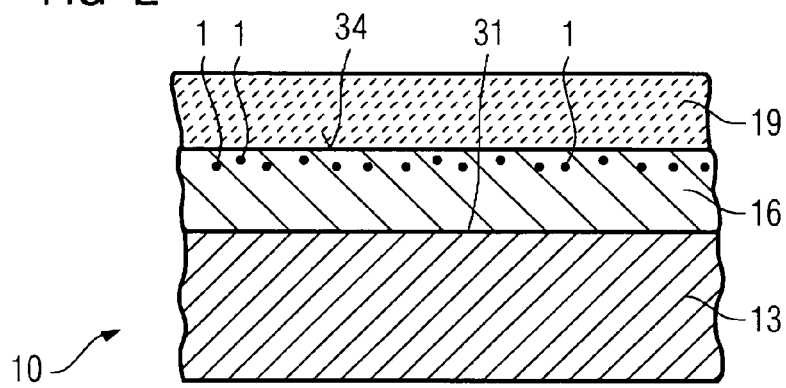

The matrix of the layer 16 is preferably metal-based. For example, the layer 16 is an alloy of the type MCrAlX, and the particles 1 consist of an aluminum compound. The particles 1 may be distributed in the entire layer 16 or be arranged, concentrated locally, near the outer surface 22 of the layer 16 (FIG. 2).

The operation of the prolonged protective action is described by way of example by means of an MCrAlX layer.

As already described further above, the protective function of the MCrAlX alloy arises in that the aluminum forms aluminum oxide, although this depletes the aluminum in the matrix material.

At high temperatures, the aluminum diffuses slowly out of the particles 1 to the matrix of the layer 16 and thus fills the matrix material up again with the aluminum consumed as a result of oxidation, so that the original composition of the MCrAlX alloy scarcely changes or does not change at all, until aluminum is no longer contained in the particle 1.

What is achieved thereby is that the useful life of the protective layer 16 is prolonged considerably.

The particles 1 are released diffusively in the matrix in two different ways. Either they are penetrated by the atoms of the matrix material, these being the atoms of the gamma phase in the case of nickel-based materials, or the non-metallic ceramic-forming bond partner diffuses into the particle inward and the metallic element dissolves in the matrix.

In the case of nickel-based materials, the metallic element, preferably aluminum, dissolves in the gamma phase. In the latter instance, a stoichiometric core of the corresponding ceramic composition would remain and, due to particle hardening, would have a permanently consolidating action for the γ'-phase.

These particles 1 may likewise be used for reinforcing a superalloy. The size of the particles 1 preferably corresponds to the optimal size of the γ'-phase of a superalloy.

The non-melted particles 1 are then preferably already present in the melt and are cast together with the latter. As regards the type of arrangement and type of operation of a secondary phase in a superalloy, reference is made to the prior art. The particles 1 then have the following functions: improving the mechanical properties and achieving an emergency running property.

The stoichiometry may also be selected such that the above-stoichiometric fraction dissolves slowly due to diffusion in the crystal structure of the matrix material of the layer 16 and, where appropriate, forms precipitations in the matrix material and therefore allows a diffusion of the material of the particle 1 directly into the matrix only after a certain time, since, up to this time point, the protective function of, for example, the MCrAlX layer is still afforded.

Figure 3:
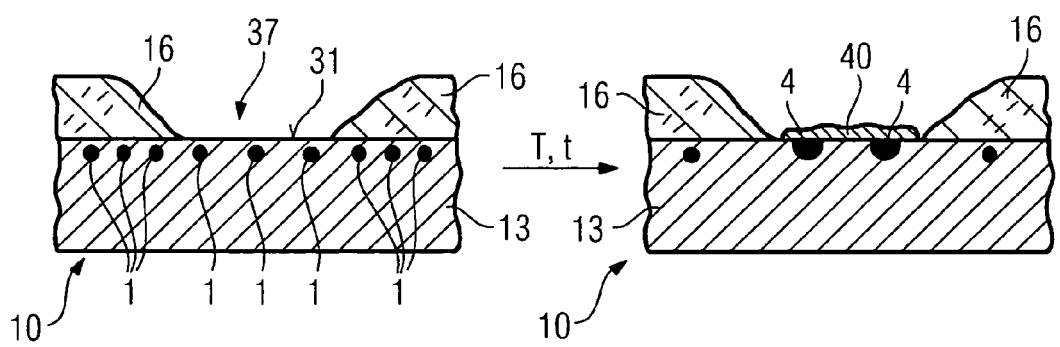

Irrespective of whether the particles 1 are also arranged in a layer 16 present on the substrate 13, in the presence of the particles 1 in the substrate 13 a further protective function is obtained:

While the layer system 10 is being used, it may happen that the layer 16 (MCrAlX or MCrAlX+outer ceramic layer) flakes off in a region 37, so that part of a surface 31 of the substrate 13 is unprotected (FIG. 3). However, in the near-surface region, the particles 1 are preferably arranged in a high concentration (FIG. 2).

Due to the further use of the layer system 10 at high temperatures T for a longer time t, the surface 31 of the substrate 13 corrodes in the region 37, with the result that that of the particles 1 is released. A reaction of the material of the particle 1 results in the protective function in the region 37 of the substrate 13. In the case of superalloys which are used for the gas turbine blades, the particle 1 has aluminum, and therefore a protective layer 40 is formed from aluminum oxide which has occurred due to the oxidation of the aluminum of the particle 1.

The particles 1 may be present either only in the layer 16 (MCrAlX) or only in the substrate 13. It is likewise possible that the particles are arranged both in a layer 16 and in the substrate 13.

Likewise, the layer 16 may constitute a protective layer against the corrosion and/or erosion of a compressor blade, the particles 1 in a layer 16, preferably having the chemical composition according to the patent EP 0 142 418 B1, resulting in sufficient sacrificial material being made available for a markedly longer period of time, so that the desired protective function is obtained.

In this case, an aluminum-containing compound is used for the particle.

During the compression of air in the compressor, water may occur which, under certain circumstances, in conjunction with other elements contained in the air, forms an electrolyte which may lead to corrosion and erosion on the compressor blades.

In order to prevent the corrosion and/or erosion, compressor blades are therefore provided, as a rule, with coatings. In this case, in particular, coatings 16 are considered which comprise a, for example, phosphate-bound basic matrix with metal particles, such as, for example, aluminum particles, distributed dispersively therein. In the protective action of a coating of this type, the metal particles embedded in the basic coating form, together with the (nobler) metal of the compressor blade and the electrolyte, a galvanic cell in which the metal particles form what are known as sacrificial anodes. The oxidation or corrosion then takes place in the sacrificial anodes, that is to say in the metal particles, not in the metal of the compressor blade.

The phosphate-bound basic matrix of the coating has glass-ceramic properties, is thermally stable and likewise corrosion-resistant and protects against mechanical actions, for example abrasion and erosion.

In addition to the metal particles, the coating may contain further particles as fillers. Colorant particles may be mentioned at this juncture as an example.

In addition to phosphate-bound coatings, further types of coatings 16 may be considered. EP 0 142 418 B1, EP 0 905 279 A1 and EP 0 995 816 A1 describe coatings based on chromate/phosphate. EP 1 096 040 A2 describes a phosphate/borate-based coating 16 and EP 0 933 446 B1 describes a phosphate/permanganate-based coating.

These layers, too, may have a matrix according to the invention.

The particles 1 can be applied together by means of virtually any coating method, that is to say by means of thermal plasma spraying (APS, VPS, LPPS), cold gas spraying, HVOF or an electrolytic coating method. FIG. 2 shows a further example of the use of the layer 16 according to the invention.

The layer system 10 consists of a substrate 13, and of a layer 16 according to the invention with a further layer 19 on the matrix of the layer 16.

This is, for example, a layer system 10 for high temperature applications, the substrate 13 again being a superalloy, as described above, and the layer 16 having a matrix of the type MCrAlX. The layer 19 is then a ceramic heat insulation layer, the protective aluminum oxide layer (TGO) being formed between the layer 16 and the layer 19. The particles 1 according to the invention are, for example, concentrated near the interface between the layers 16 and 19.

A component may likewise be envisaged, consisting of a material which has the particles 1, that is to say they are not present in a coating, but, instead, in a solid material.

FIG. 4 shows by way of example a gas turbine 100 in a longitudinal part section.

The gas turbine 100 has inside it a rotor 103 rotatably mounted about an axis of rotation 102 and having a shaft 101, said rotor also being designated as a turbine rotor.

Arranged successively along the rotor 103 are an intake housing 104, a compressor 105, a, for example, toroidal combustion chamber 110, in particular annular combustion chamber, having a plurality of coaxially arranged burners 107, a turbine 108 and the exhaust gas housing 109.

The annular combustion chamber 110 communicates with a, for example, annular hot gas duct 111. There, for example, four turbine stages 112 connected in series form the turbine 108.

Each turbine stage 112 is formed, for example, from two blade rings. As seen in the flow direction of a working medium 113, a row 125 formed from moving blades 120 follows a guide vane row 115 in the hot gas duct 111.

The guide vanes 130 are in this case fastened to an inner housing 138 of a stator 143, whereas the moving blades 120 of a row 125 are mounted on the rotor 103, for example, by means of a turbine disk 133.

A generator or a working machine (not illustrated) is coupled to the rotor 103.

When the gas turbine 100 is in operation, air 135 is sucked in through the intake housing 104 by the compressor 105 and is compressed. The compressed air provided at the turbine-side end of the compressor 105 is routed to the burners 107 and is mixed there with a fuel. The mixture is then burnt, at the same time forming the working medium 113, in the combustion chamber 110. The working medium 113 flows from there along the hot gas duct 111 past the guide vanes 130 and the moving blades 120. At the moving blades 120, the working medium 113 expands so as to transmit a pulse, with the result that the moving blades 120 drive the rotor 103 and the latter drive the working machine coupled to it.

The components exposed to the hot working medium 113 are subject to thermal loads while the gas turbine 100 is in operation. The guide vanes 130 and moving blades 120 of the first turbine stage 112, as seen in the flow direction of the working medium 113, are subjected to the highest thermal load in addition to the heat shield elements lining the annular combustion chamber 110.

In order to withstand the temperatures prevailing there, these can be cooled by means of a coolant.

Substrates of the components may likewise have a directional structure, that is to say they are monocrystalline (SX structure) or have only longitudinally directed grains (DS structure).

The material used for the components, in particular for the turbine blade 120, 130 and components of the combustion chamber 110, is, for example, iron-, nickel- or cobalt-based superalloys.

Such superalloys are known, for example, from EP 1 204 776 B1, EP 1 306 454, EP 1 319 729 A1, WO 99/67435 or WO 00/44949; these publications are part of the disclosure with regard to the chemical composition of the alloys.

The guide vane 130 has a guide vane root (not illustrated here) facing the inner housing 138 of the turbine 108 and a guide vane head lying opposite the guide vane root. The guide vane head faces the rotor 103 and is secured to a fastening ring 140 of the stator 143.

Figure 5:
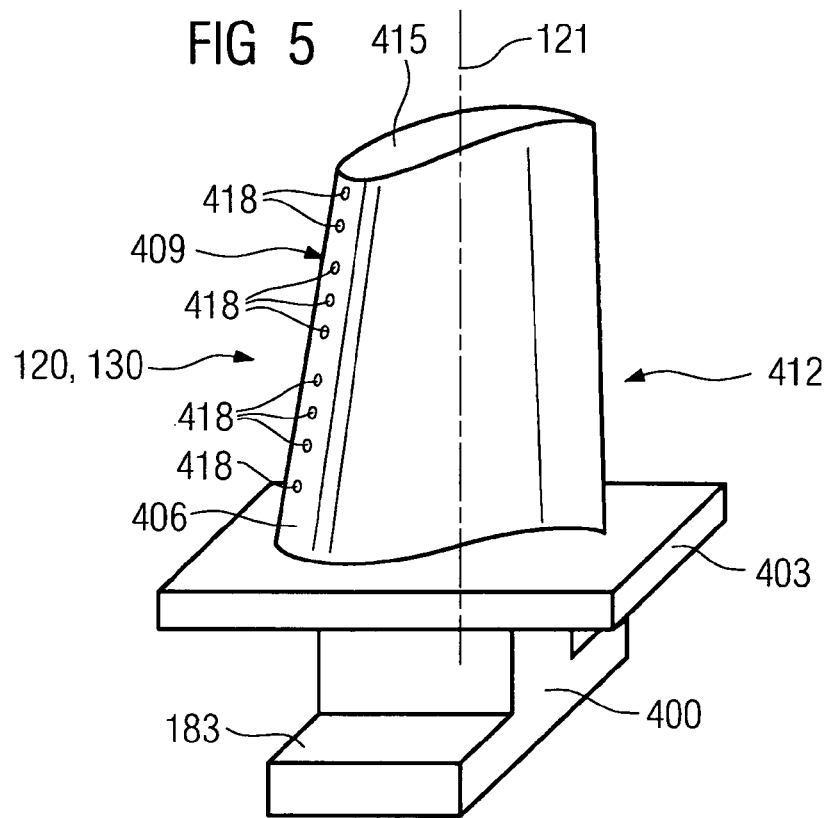
FIG. 5 shows a turbine blade in perspective.

FIG. 5 shows a perspective view of a moving blade 120 or guide vane 130 of a turbomachine which extends along a longitudinal axis 121.

The turbomachine may be a gas turbine of an aircraft or of a power station for electricity generation, a steam turbine or a compressor.

The blade 120, 130 has successively along the longitudinal axis 121 a fastening region 400, a blade platform 403 contiguous to the latter and also a blade leaf 406 and a blade tip 415.

As a guide vane 130, the blade 130 may have (not illustrated) a further platform at its blade tip 415.

In the fastening region 400, a blade root 183 is formed, which serves for fastening the moving blades 120, 130 to a shaft or a disk (not illustrated).

The blade root 183 is configured, for example, as a hammer head. Other configurations as a pinetree or dovetail root are possible.

The blade 120, 130 has a leading edge 409 and a trailing edge 412 for a medium which flows past the blade leaf 406.

In conventional blades 120, 130, for example, solid metallic materials, in particular superalloys, are used in all regions 400, 403, 406 of the blade 120, 130.

Such superalloys are known, for example, from EP 1 204 776 B1, EP 1 306 454, EP 1 319 729 A1, WO 99/67435 or WO 00/44949; these publications are part of the disclosure with respect to the chemical composition of the alloy.

The blade 120, 130 may in this case be manufactured by means of a casting method, also by means of directional solidification, by a forging method, by a milling method or by combinations of these.

Workpieces having a monocrystalline structure or structures are used as components for machines which are exposed during operation to high mechanical, thermal and/or chemical loads.

The manufacture of monocrystalline workpieces of this type is carried out, for example, by directional solidification from the melt. Casting methods are adopted here, in which the liquid metallic alloy solidifies to the monocrystalline structure, that is to say to the monocrystalline workpiece, or directionally.

In this case, dendritic crystals are oriented along the heat flow and form either a columnar-crystalline grain structure (columnar, that is to say grains which run over the entire length of the workpiece and are designated here, according to general linguistic practice, as being directionally solidified) or a monocrystalline structure, that is to say the entire workpiece consists of a single crystal. In these methods, the transition to globulitic (polycrystalline) solidification must be avoided, since, due to undirected growth, transverse and longitudinal grain boundaries are necessarily formed which nullify the good properties of the directionally solidified or monocrystalline component.

When directionally solidified structures are referred to in general, this means both monocrystals which have no grain boundaries or, at most, low-angle grain boundaries, and columnar-crystal structures which have grain boundaries running in the longitudinal direction, but no transverse grain boundaries. The second-mentioned crystalline structures are also referred to as directionally solidified structures.

Such methods are known from U.S. Pat. No. 6,024,792 and EP 0 892 090 A1; these publications are part of the disclosure with respect to the solidification method.

The blades 120, 130 may likewise have coatings against corrosion or oxidation, for example (MCrAlX; M is at least one element of the group iron (Fe), cobalt (Co), nickel (Ni), X is an active element and stands for yttrium (Y) and/or silicon and/or at least one rare earth element, or hafnium (Hf). Such alloys are known from EP 0486 489 B1, EP 0 786 017 B1, EP 0 412 397 B1 or EP 1 306 454 A1 which are to be part of this disclosure with respect to the chemical composition of the alloy.

The density preferably lies at 95% of the theoretical density.

A protective aluminum oxide layer (TGO=thermal grown oxide layer) is formed on the MCrAlX layer (as an intermediate layer or as the outermost layer).

On the MCrAlX, a heat insulation layer may also be present, which is preferably the outermost layer, and consists, for example, of $ZrO_2$, $Y_2O_3$—$ZrO_2$, that is to say it is not or is partially or completely stabilized by yttrium oxide and/or calcium oxide and/or magnesium oxide.

The heat insulation layer covers the entire MCrAlX layer. Columnar grains are generated in the heat insulation layer by means of suitable coating methods, such as, for example, electron beam evaporation (EB-PVD). Other coating methods may also be envisaged, for example atmospheric plasma spraying (APS), LPPS, VPS or CVD.

The heat insulation layer may have porous microcrack- or macrocrack-susceptible grains for better thermal shock resistance. The heat insulation layer is therefore preferably more porous than the MCrAlX layer.

The blade 120, 130 may be of hollow or solid design. If the blade 120, 130 is to be cooled, it is hollow and, if appropriate, also has film cooling holes 418 (indicated by dashes).

Figure 6:
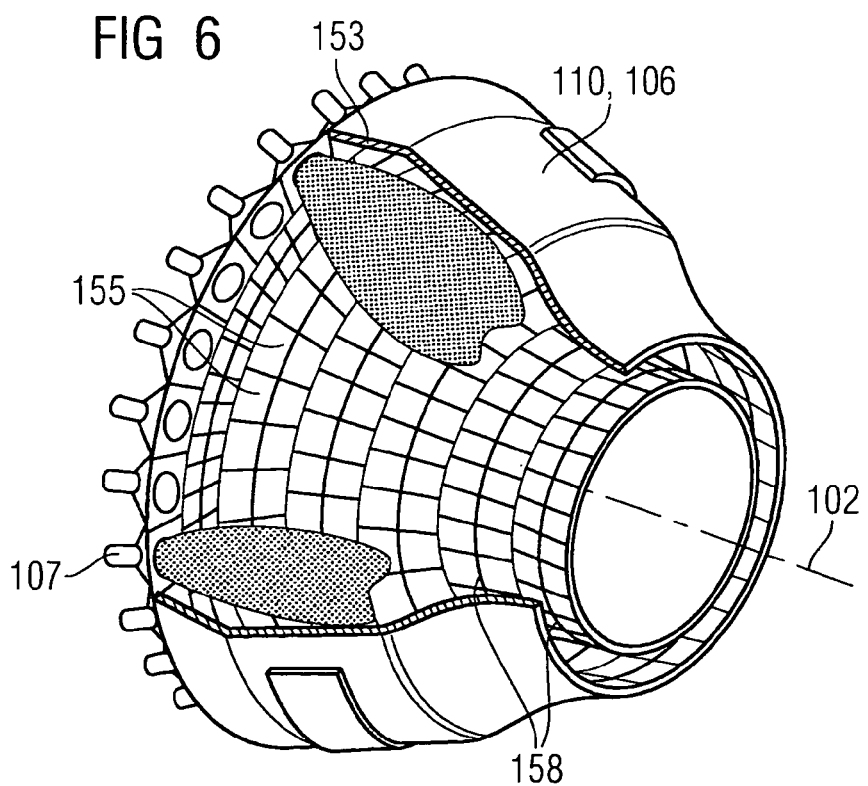
FIG. 6 shows a combustion chamber in perspective.

FIG. 6 shows a combustion chamber 110 of the gas turbine 100. The combustion chamber 110 is configured, for example, as what is known as an annular combustion chamber, in which a multiplicity of burners 107 arranged around an axis of rotation 102 in the circumferential direction issue into a common combustion chamber space 154 and generate the flames 156. For this purpose, the combustion chamber 110 is configured in its entirety as an annular structure which is positioned around the axis of rotation 102.

To achieve a comparatively high efficiency, the combustion chamber 110 is designed for a comparatively high temperature of the working medium M of about 1000° C. to 1600° C. In order to make a comparatively long operating time possible even in the case of these operating parameters which are unfavorable for the materials, the combustion chamber wall 153 is provided on its side facing the working medium M with an inner lining formed from heat shield elements 155.

Moreover, on account of the high temperatures inside the combustion chamber 110, a cooling system may be provided for the heat shield elements 155 or for their holding elements. The heat shield elements 155 are then, for example, hollow and, if appropriate, also have cooling holes (not illustrated) issuing into the combustion chamber space 154.

Each heat shield element 155 consisting of an alloy is equipped on the working medium side with a particularly heat-resistant protective layer (MCrAlX layer and/or ceramic coating) or is manufactured from a material resistant to high temperature (solid ceramic bricks).

These protective layers may be similar to those of the turbine blades, that is to say, for example, MCrAlX: M is at least one element of the group iron (Fe), cobalt (Co), nickel (Ni), X is an active element and stands for yttrium (Y) and/or silicon and/or a rare earth element, or hafnium (Hf). Such alloys are known from EP 0 486 489 B1, EP 0 786 017 B1, EP 0 412 397 B1 or EP 1 306 454 A1 which are to be part of this disclosure with respect to the chemical composition of the alloy.

On the MCrAlX, a, for example, ceramic heat insulation layer may also be present and consists, for example, of $ZrO_2$, $Y_2O_3$—$ZrO_2$, that is to say it is not or is partially or completely stabilized by yttrium oxide and/or calcium oxide and/or magnesium oxide.

Columnar grains are generated in the heat insulation layer by means of suitable coating methods, such as, for example, electron beam evaporation (EB-PVD).

Other coating methods may be envisaged, for example atmospheric plasma spraying (APS), LPPS, VPS or CVD. The heat insulation layer may have porous microcrack- or macrocrack-susceptible grains for better thermal shock resistance.

Refurbishment means that turbine blades 120, 130 or heat shield elements 155, after being used, must, where appropriate, be freed of protective layers (for example by sandblasting). A removal of the corrosion and/or oxidation layers or products is then carried out. If appropriate, cracks in the turbine blade 120, 130 or in the heat shield element 155 are also repaired. This is followed by a recoating of the turbine blades 120, 130 and heat shield elements 155 and a renewed use of the turbine blades 120, 130 or of the heat shield elements 155.

The invention claimed is:

1. A matrix with particles for a component or a layer, comprising:
   a matrix material having at least one metal element,
   wherein each particle of the matrix material includes either an oxide, a nitride, a boride, aluminum nitride or aluminum oxynitride, or
   wherein a compound of the particle includes a Si—O—C—Me compound, and the metal element in the compound has a non-stoichiometric fraction, and
   wherein a casing consists of the same material as the particle.

2. The matrix as claimed in claim 1, wherein the at least one metal element in the compound has an above-stoichiometric fraction.

3. The matrix as claimed in claim 2, wherein the particle has only one metal element.

4. The matrix as claimed in claim 2, wherein the particle has only two metal elements, a first metal element and a second metal element.

5. The matrix as claimed in claim 4, wherein the first metal element is aluminum.

6. The matrix as claimed in claim 4, wherein the first metal element is chromium.

7. The matrix as claimed in claim 4, wherein the particle comprises aluminum and chromium as the first metal element and the second metal element, respectively.

8. The matrix as claimed in claim 7, wherein the particle has aluminum oxide and/or chromium oxide.

9. The matrix as claimed in claim 8, wherein the particle is grain-like.

10. The matrix as claimed in claim 9, wherein a diameter of the particle is ≦500 nm.

11. The matrix as claimed in claim 10, wherein the second metal element is not a constituent of the matrix material.

12. The matrix as claimed in claim 9, wherein a further element is a constituent of the matrix material.

13. A layer system, comprising:
a substrate; and
at least one layer which is arranged on the substrate, wherein the layer has a matrix material having at least one metal element,
wherein each particle of the matrix material includes either an oxide, a nitride, a boride, aluminum nitride or aluminum oxynitride, or
wherein a compound of the particle includes a Si—O—C-Me compound, and the metal element in the compound has a non-stoichiometric fraction, and
wherein a casing consists of the same material as the particle.

14. The layer system as claimed in claim 13, wherein a further layer is arranged on the layer.

15. The layer system as claimed in claim 14, wherein the layer is metallic.

16. The layer system as claimed in claim 15, wherein the layer is a MCrAlX alloy.

17. The layer system as claimed in claim 14, wherein the layer is ceramic or glass-ceramic, and in that the substrate is metallic.

18. The layer system as claimed in claim 17, wherein a gradient in the concentration of the particles is present within the layer and/or the substrate.

19. The layer system as claimed in claim 18, wherein the substrate or the layer has a matrix.

* * * * *